United States Patent
Auslander et al.

(10) Patent No.: US 7,379,205 B2
(45) Date of Patent: May 27, 2008

(54) SYSTEM AND METHOD FOR EMBEDDING AND EXTRACTING KEY INFORMATION

(75) Inventors: Judith D. Auslander, Westport, CT (US); Steven M. Kaye, Weston, CT (US); Jeffrey D. Pierce, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 834 days.

(21) Appl. No.: 10/737,006

(22) Filed: Dec. 16, 2003

(65) Prior Publication Data

US 2005/0129229 A1   Jun. 16, 2005

(51) Int. Cl.
*H04N 1/40* (2006.01)
*H04N 1/56* (2006.01)

(52) U.S. Cl. .............. 358/1.9; 358/3.28; 358/530; 358/540

(58) Field of Classification Search ............. 358/1.9, 358/3.28, 501, 530, 540; 382/191, 135; 250/271, 250/458.1, 459.1, 461.1; 235/468, 491; 283/92; 347/107
See application file for complete search history.

(56) References Cited

U.S. PATENT DOCUMENTS

| | | | |
|---|---|---|---|
| 4,586,811 A * | 5/1986 | Kubo et al. ............ | 399/366 |
| 4,857,955 A | 8/1989 | Crandall ............ | 355/328 |
| 5,602,939 A * | 2/1997 | Hashiguchi et al. ......... | 283/88 |
| 5,617,187 A * | 4/1997 | Hayashi et al. ............ | 250/271 |
| 5,642,442 A * | 6/1997 | Morton et al. ............ | 382/227 |
| 5,719,948 A * | 2/1998 | Liang ............ | 283/72 |
| 5,740,514 A * | 4/1998 | Natsudaira ............ | 283/88 |
| 5,763,891 A * | 6/1998 | Yoshinaga et al. ........ | 250/459.1 |
| 5,771,315 A * | 6/1998 | Matsuyama ............ | 382/191 |
| 5,867,586 A * | 2/1999 | Liang ............ | 283/92 |
| 5,912,682 A | 6/1999 | Parkos ............ | 347/40 |
| 6,051,826 A * | 4/2000 | Arimoto et al. ........ | 250/208.1 |
| 6,078,682 A * | 6/2000 | Tanioka et al. ............ | 382/135 |
| 6,184,534 B1 * | 2/2001 | Stephany et al. ........ | 250/459.1 |
| 6,373,965 B1 * | 4/2002 | Liang ............ | 382/181 |
| 6,644,764 B2 * | 11/2003 | Stephens, Jr. ............ | 347/107 |
| 6,718,046 B2 * | 4/2004 | Reed et al. ............ | 358/3.28 |
| 6,721,440 B2 * | 4/2004 | Reed et al. ............ | 358/3.28 |

(Continued)

FOREIGN PATENT DOCUMENTS

| | | | | |
|---|---|---|---|---|
| JP | 405156245 A | | 6/1993 | |
| JP | 406096298 A | | 4/1994 | ............ 235/494 |
| JP | 2005262681 A | * | 9/2005 | |

*Primary Examiner*—Scott A. Rogers
(74) *Attorney, Agent, or Firm*—Charles R. Malandra, Jr.; Angelo N. Chaclas

(57) ABSTRACT

In accordance with an embodiment of the invention, a method for embedding key information into a printed document is disclosed. The method comprises creating a first section comprising a first ink having a first color under white light; and creating a second section comprising a second different ink. The second ink comprises a fluorescent ink and has a second color under white light which is substantially the same as the first color, and the fluorescent ink has a fluorescence when subjected to fluorescent-exciting radiation. The first section and the second section are visually indiscernible from each other on the printed document in white light. Also, the second section comprises key information, which is selected or highlighted by a user during creation of the document, and the first section comprises non-selected information.

36 Claims, 2 Drawing Sheets

U.S. PATENT DOCUMENTS

| | | |
|---|---|---|
| 6,763,123 B2 * | 7/2004 | Reed et al. .................. 382/100 |
| 6,804,377 B2 * | 10/2004 | Reed et al. ................. 358/3.28 |
| 6,912,295 B2 * | 6/2005 | Reed et al. .................. 382/100 |
| 7,005,166 B2 * | 2/2006 | Narita et al. ................. 428/690 |
| 7,062,106 B2 * | 6/2006 | Hayashide ................ 250/341.8 |
| 7,148,493 B2 * | 12/2006 | Tehrani ................... 250/461.1 |
| 7,182,451 B2 * | 2/2007 | Auslander .................... 235/491 |
| 2005/0087605 A1 * | 4/2005 | Auslander et al. .......... 235/491 |

* cited by examiner

SYSTEM AND METHOD FOR EMBEDDING AND EXTRACTING KEY INFORMATION

BACKGROUND OF THE INVENTION

1. Field of the Invention

The present invention relates generally to document creation and management systems and, more particularly, to a system and method for embedding and extracting key information.

2. Background Information

Some current document management and archival systems rely on scanning documents and storing optical representations. Most of these systems offer capabilities to search for stored documents. Such systems may rely on either optical character recognition (OCR) and indexing of the entire document or labor intensive entry of keywords at the time of scanning.

A disadvantage of OCR is that all information is given equal weight. For example, a term at the top of the document is treated the same as that term located further down in the body of the document. This decreases accuracy when searching for critical information at particular locations of a document. Entry of keywords at the time of document storage improves the search function, but is time consuming and labor intensive.

Accordingly, there is a need for a system and method for selecting or highlighting key information at the time of document creation to enhance search capability, while not adversely affecting the appearance or format of the document.

SUMMARY OF THE INVENTION

In accordance with an embodiment of the invention, a method for embedding key information into a printed document is disclosed. The method comprises creating a first section comprising a first ink having a first color under white light; and creating a second section comprising a second different ink. The second ink comprises a fluorescent ink and has a second color under white light which is substantially the same as the first color, and the fluorescent ink has a fluorescence when subjected to fluorescent-exciting radiation. The first section and the second section are visually indiscernible from each other on the printed document in white light. Also, the second section comprises key information, which is selected or highlighted by a user during creation of the document, and the first section comprises non-selected information.

In accordance with another embodiment of the invention, a method for extracting key information is disclosed. The method comprises subjecting a printed document to a first image scanner, responsive to visible light for acquiring a first image of a first section for providing a first signal indicative of the first image; and subjecting the printed document to a second image scanner, responsive to fluorescent emission for acquiring a second image of a second section for providing a second signal indicative of the second image. The printed document is scanned into an electronic archival system, and key information of the second section is detected, extracted and indexed so that the scanned document can be retrieved based on the key information.

In accordance with a further embodiment of the invention, a system for extracting key information is disclosed. The system comprises a first image scanner, responsive to visible light for acquiring a first image of a first section of a printed document, for providing a first signal indicative of the first image; and a second image scanner, responsive to fluorescent emission for acquiring a second image of a second section of the printed word processing document, for providing a second signal indicative of the second image. The printed document is scanned into an electronic archival system, and key information of the second section is detected, extracted and indexed so that the scanned document can be retrieved based on the key information.

In accordance with another embodiment of the invention, a printed word processing document is disclosed. The printed word processing document comprises a first section comprising a first ink having a first color under white light; and a second section comprising a second different ink. The second ink comprises a fluorescent ink and has a second color under white light which is substantially the same as the first color. The fluorescent ink has a fluorescence when subjected to fluorescent-exciting radiation. The first section and the second section are visually indiscernible from each other on the printed word processing document in white light. The second section comprises key information, which is selected or highlighted by a user during creation of the document by word processing, and the first section comprises non-selected information.

In accordance with yet another embodiment of the invention, a system for embedding and extracting key information is disclosed. The system comprises a first image scanner, responsive to visible light for acquiring a first image of the first section of the afore-described printed word processing document, for providing a first signal indicative of the first image; and a second image scanner, responsive to fluorescent emission for acquiring a second image of the second section of the printed word processing document, for providing a second signal indicative of the second image. The printed word processing document is scanned into an electronic archival system, and the key information of the second section is detected, extracted and indexed so that the scanned document can be retrieved based on the key information.

In accordance with a further embodiment of the invention, a system for printing the afore-described word processing document is disclosed. The system comprises a print head system adapted to print at least two different inks on the document, including the first ink and the second different ink. The system further comprises a controller for controlling application of the first and second inks by the print head system on the document, wherein the controller is adapted to print the first and second inks such that the first and second inks are visually indiscernible from each other in white light, and the second ink is discernible from the first ink when subjected to fluorescent-excitation radiation.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
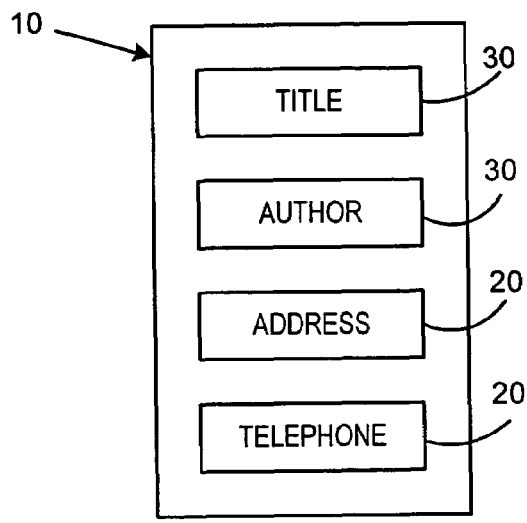
FIG. 1 is a plan view of a printed document 10 incorporating features of an embodiment of the invention.

Referring to FIG. 1, there is shown a plan view of a printed document 10 incorporating features of an embodiment of the invention. Although the invention will be described with reference to the embodiments shown in the drawings, it should be understood that the present invention can be embodied in many alternate forms of embodiments. In addition, any suitable size, shape or type of elements or materials could be used.

In the embodiment shown, the printed document 10 generally comprises printed words on paper. However, in alternate embodiments, features of the invention could be used in any suitable type of printed information. For example, features of the present invention could be used with indicium, such symbols, etc., printed on a document such as a card, or similar items. The printed document 10, in the embodiment shown, comprises a first section 20 and a second section 30.

The first section 20 corresponds to non-highlighted or non-selected information. The second section 30 includes key information, which is selected or "highlighted" at the time of document creation preferably using standard word processing techniques. For example, document production may begin with use of a standard application, such as a word processor. One known word processor is Microsoft Corporation's WORD. As is known in the art, a primary use of computers is word processing, which has replaced typewriters as the primary means of document production. Current word processors allow a user to input information or text of a document into a computer. Once the document is in the computer, the user can edit or modify the document, as desired.

A feature of some known word processors is a "highlighting" feature, whereby the user chooses certain key words or key information to be highlighted by selecting the highlighting option on the toolbar. For example, important document content information, such as an abstract, outline headings or important passages, may be highlighted. Similarly, using predefined templates, certain key words or fields may be highlighted by default. In some current word processors, the user may either display or hide highlighting, but not the text itself, on the computer screen and in the printed document.

In the embodiment shown in FIG. 1, the printed document 10 is the first page of an article, and the second section 30 or key information highlighted by the afore-described process corresponds to the authors' names and the title of the article, which are set forth in block form for illustration purposes. The first section 20, comprising the non-selected or non-highlighted information, corresponds to the authors' address and telephone numbers, which are also set forth in block form for illustration purposes. One skilled in the art would recognize that in the actual creation of such a document, the actual title, authors' names, addresses and telephone numbers would be printed instead of the block format shown in FIG. 1. In alternate embodiments, the second section 30 could comprise additional or alternative selected or highlighted words, symbols, etc. Similarly, in alternate embodiments, the first section 20 could comprise additional or alternative non-selected or non-highlighted words, symbols, etc.

In the embodiment shown in FIG. 1, the first section 20 and the second section 30 have a black color appearance in white light. In particular, a general solid, substantially uniform black appearance is shown in both sections 20, 30. However, the first section 20 and second section 30 could be comprised of other colors. In an alternate embodiment, the sections 20, 30 could be comprised of multiple, different colors.

The first section 20 is printed with a first ink having a first color under white light. In the embodiment shown in FIG. 1, the first color comprises the color black. The first ink comprises a non-fluorescent ink. The second section 30 is printed with a second different ink having a second color under white light. In the embodiment, shown, the second color is the same as the first color; namely black. The second ink comprises a fluorescent ink. More specifically, the second ink comprises a black fluorescent ink such as disclosed in U.S. patent application publication Nos. US 2002/0195586 A1, US 2003/005303 A1, and US 2003/0041774 A1, the contents of which are herein incorporated by reference. In alternate embodiments, any suitable type of ink could be used for the first ink and any suitable fluorescent ink could be used for the second ink, and preferably the colors are substantially the same.

Because the second ink has substantially the same color as the first ink under white light, the second section 30 is virtually indistinguishable from the first section 20 under white light conditions. Only when the second section 30 is subjected to fluorescent-exciting radiation does the second section 30 become distinguishable from the first section 20.

Figure 2:
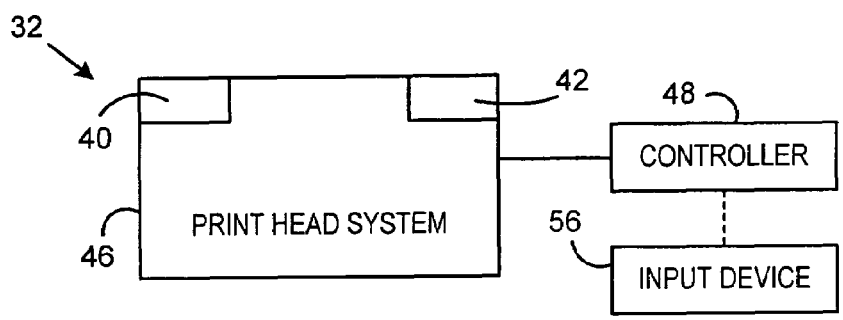
FIG. 2 is a diagrammatic view of a system for printing in accordance with an embodiment of the invention.

Referring to FIG. 2, there is shown a diagrammatic view of a system 32 for printing the document 10. One system for printing is described in U.S. patent application Ser. No. 10/692,569, filed Oct. 24, 2003, entitled "Fluorescent Hidden Indicium", which is hereby incorporated by reference. The system of FIG. 2 may generally comprise a print head system 46 operably connected to a controller 48. The print head system 46 is adapted to print at least two different inks onto a substrate. The print head system comprises a first supply 40 of the first ink and a second supply 42 of the second different ink. As described above, the second ink comprises a color fluorescent ink, which has a second color under white light, such as black, blue or red, for example. The second ink comprises a color fluorescent ink, which is substantially the same as the first color, and which is at fluorescent when subjected to a fluorescent exciting radiation illumination source.

The print head system could comprise at least two print heads. In an alternate embodiment, the print head system could comprise a single print head adapted to pass by an area on the substrate at least two times, a first one the times for printing the first ink and a second one of the times for printing the second ink.

The controller 48 is adapted for controlling application of the first and second inks by the print head system 46 on the item. In a preferred embodiment, the controller 48 is adapted to control the print head system 46 to print the first and second inks such that the first and second inks are substantially indiscernible from each other in white light. The controller is further adapted to control the print head such that only the selected or highlighted information of the second section 20 is printed with the second, fluorescent ink.

In one type of embodiment, the system can comprise an input device 56 which is coupled to the controller 48. The controller can be adapted to change the highlighted information on demand by a user, or automatically.

Once the document 10 is printed, the printed information of the first section 20 and the second section 30 are virtually indiscernible from one another under white light conditions. Advantageously, the "highlighted" key information or key words of the second section 30, which were chosen by the user upon creation of the document are printed with fluorescent ink.

The printed document 10 may then be circulated and reviewed, for example. In alternate embodiments, the printed document 10 may comprise any suitable type of printed document. For example, the printed document 10 may comprise a contract printed with certain highlighted information or key words, such as client name, date, case identification number, subject, etc, as the second section 30 in the fluorescent ink. Similarly, the contract may be reviewed, circulated, signed, approved, etc.

Figure 3:
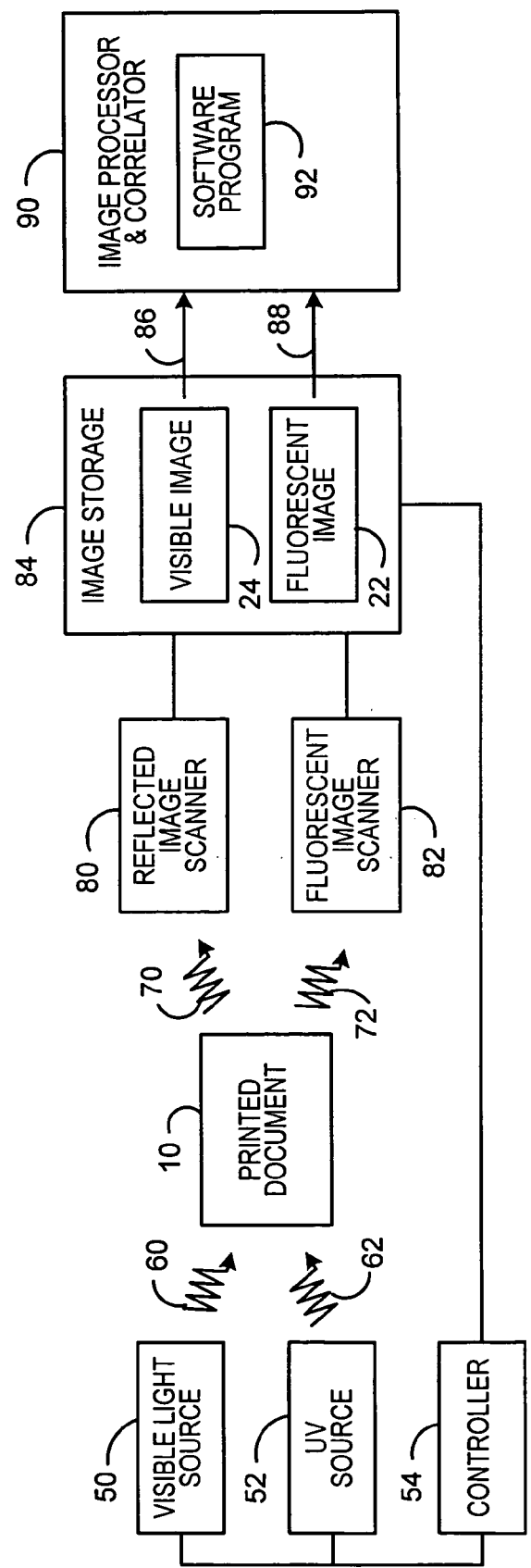
FIG. 3 is a diagrammatic view of a system for extracting the key information or second section 30 in accordance with an embodiment of the invention.

The printed document 10 may then be scanned into an electronic archival system. The printed document 10 may also be scanned into an electronic archival system upon printing. FIG. 3 illustrates a scanning system for extracting key information, such as the key or highlighted information of the second section 30 of the printed document 10. As shown in FIG. 3, a visible light source 50 is used to provide illuminating light 60 on the printed document 10. With the reflected light 70 from the printed document 10, a reflected image scanner 80 can acquire the visible image 24. Similarly, an ultraviolet light source 52 is used to provide illuminating light 62 on the printed document 10. With the fluorescent emission 72 from the printed document 10, the fluorescent image scanner 82 can acquire the fluorescent image 22. Preferably, a controlling mechanism 54 is used to coordinate the illumination by the illuminating sources 50, 52 and the image acquisition by the image scanners 80, 82. The reflected image scanner 80 and the fluorescent image scanner 82 can acquire the respective images separately and sequentially. However, it is also possible to acquire the visible image 24 and the fluorescent image 22 simultaneously when appropriate filters and optical components are used to direct the reflected light 70 and the fluorescent emission 72 to the respective image scanners. The fluorescent image 22 and the visible image 24 may be stored in an image storage means 84, so that they may be processed and compared. As shown, a signal or image data 86 indicative of the fluorescent image 22 and a signal or image data 88 indicative of the visible image 24 may be conveyed to an image processing and correlation device 90. Because the fluorescent image is the "negative" image of the visible image 24, it may be preferable to process the image data 86, 88 before any comparison of the image data 86, 88. For example, a software program 92, or alternatively software in the personal computer or other device controlling the scanner, may be used to distinguish the document elements printed with non-fluorescent ink (first section 20) from those printed with fluorescent ink (second section 30), and thus the key information of the second section 30 could then be used by an archival system to index the document. For example, a standard coding scheme such as Extensible Markup Language (XLM), among others, may be employed. Thus, during scanning, the scanner may advantageously detect and extract the "highlighted" key words, perform optical character recognition, and index the document in the database, accordingly. The document may then be retrieved rapidly and accurately based on the key words.

Figure 4:
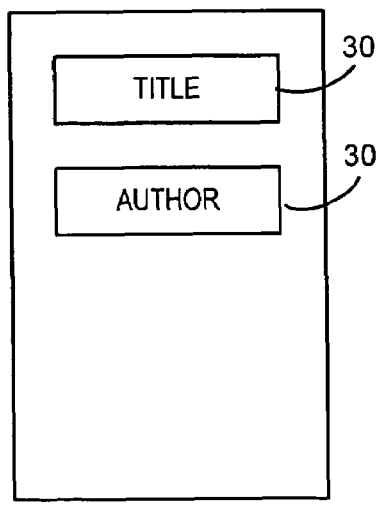
FIG. 4 is a plan view of the printed document of FIG. 1 after being scanned in accordance with an embodiment of the invention.

FIG. 4 is a plan view of the printed document of FIG. 1 after being scanned, showing the key words of the second section 30.

In alternate embodiments, the print head system 46 described above could comprise more than the two ink supplies 40, 42. For example, the print head system could comprise two or more different fluorescent ink supplies 42 and a non-fluorescent ink supply 40 in a three or more reservoir ink jet printer. The fluorescent inks preferably differ in the ultraviolet wavelengths at which they fluoresce. The system described above may then be employed to differentiate between the type of fluorescent information or key words and thus classify them differently. For example, section headings of an article could fluoresce under short wave ultraviolet excitation and content words could fluoresce under long wave ultraviolet excitation. Advantageously, this would allow the classification and search software to have a more fine-tuned control over information storage and retrieval.

In further alternant embodiments of the invention, the above print head system could comprise a non-fluorescent ink and two or more different fluorescent ink supplies, wherein at least one fluorescent ink is an invisible fluorescent ink. Any suitable invisible fluorescent ink jet ink may be employed, including those described in U.S. patent application Ser. No. 10/331,829, filed Dec. 30, 2002, the contents of which are also hereby incorporated by reference in its entirety. In this embodiment, the invisible fluorescent ink may be used to print any desired information, including words or symbols, and preferably an invisible bar code or OCR readable text before or after a fluorescent key word. The barcode may contain classification information that would tag the fluorescent key word with information allowing the key word to be placed into the appropriate database field upon scanning, using the mechanism described above. A standard coding scheme such as Extensible Markup Language (XML) could be used to identify and classify the key words in a document.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for embedding key information into a printed document comprising the steps of:
   creating a first section comprising a first ink having a first color under white light; and
   creating a second section comprising a second different ink, wherein the second ink comprises a fluorescent ink and has a second color under white light which is substantially the same as the first color, wherein the fluorescent ink has a fluorescence when subjected to fluorescent-exciting radiation, and wherein the first section and the second section are visually indiscernible from each other on the printed document in white light;
   the second section comprising key information, which is selected during creation of the document, and the first section comprises non-selected information.

2. The method of claim 1, wherein the key information is selected using word processing.

3. The method of claim 2, wherein the printed document is a document printed on paper, with the first section comprising words or symbols and the second section comprising words or symbols.

4. The method of claim 3, wherein the document is a card.

5. The method of claim 1, wherein the first and second sections each comprise a black color ink.

6. The method of claim 1, wherein the second section comprises at least two different fluorescent inks.

7. The method of claim 6, wherein one of the fluorescent inks comprises an invisible ink.

8. The method of claim 7, wherein the invisible ink is used to print an invisible bar code or optical character recognition text.

9. A method for extracting key information comprising the steps of:
subjecting a printed document to a first image scanner, responsive to visible light for acquiring a first image of a first section for providing a first signal indicative of the first image, the first section comprises a first ink having a first color under white light; and
subjecting the printed document to a second image scanner, responsive to fluorescent emission for acquiring a second image of a second section for providing a second signal indicative of the second image, the second section comprising a second different ink, wherein the second ink comprises a fluorescent ink and has a second color under white light which is substantially the same as the first color, wherein the fluorescent ink has a fluorescence when subjected to fluorescent-exciting radiation, and wherein the first section and the second section are visually indiscernible from each other on the printed document in white light;
wherein the printed document is scanned into an electronic archival system, and key information of the second section is detected, extracted and indexed so that the scanned document can be retrieved based on the key information.

10. The method of claim 9, wherein the second section comprises key information, which is selected during creation of the document by word processing, and the first section comprises non-selected information.

11. The method of claim 9, wherein the first and second sections each comprise a black color ink.

12. The method of claim 9, wherein the second section comprises at least two different fluorescent inks.

13. The method of claim 12, wherein one of the fluorescent inks comprises an invisible ink.

14. The method of claim 13, wherein the invisible ink is used to print an invisible bar code or optical character recognition text.

15. A system for extracting key information comprising:
a first image scanner, responsive to visible light for acquiring a first image of a first section of a printed document, for providing a first signal indicative of the first image, the first section comprising a first ink having a first color under white light; and
a second image scanner, responsive to fluorescent emission for acquiring a second image of a second section of the printed word processing document, for providing a second signal indicative of the second image, the second section comprising a second different ink, wherein the second ink comprises a fluorescent ink and has a second color under white light which is substantially the same as the first color, wherein the fluorescent ink has a fluorescence when subjected to fluorescent-exciting radiation, and wherein the first section and the second section are visually indiscernible from each other on the printed document in white light;
wherein the printed document is scanned into an electronic archival system, and key information of the second section is detected, extracted and indexed so that the scanned document can be retrieved based on the key information.

16. The system of claim 15, wherein the second section comprises key information, which is selected during creation of the document by word processing, and the first section comprises non-selected information.

17. The system of claim 15, wherein the first and second sections each comprise a black color ink.

18. The system of claim 15, wherein the second section comprises at least two different fluorescent inks.

19. The system of claim 18 wherein one of the fluorescent inks comprises an invisible ink.

20. The system of claim 19, wherein the invisible ink is used to print an invisible bar code or optical character recognition text.

21. A printed word processing document comprising:
a first section comprising a first ink having a first color under white light; and
a second section comprising a second different ink, wherein the second ink comprises a fluorescent ink and has a second color under white light which is substantially the same as the first color, wherein the fluorescent ink has a fluorescence when subjected to fluorescent-exciting radiation, and wherein the first section and the second section are visually indiscernible from each other on the printed word processing document in white light,
the second section comprising key information, which is selected during creation of the document by word processing, and the first section comprises non-selected information.

22. A system for embedding and extracting key information in the printed word processing document of claim 21 comprising:
a first image scanner, responsive to visible light for acquiring a first image of the first section of the printed word processing document, for providing a first signal indicative of the first image; and
a second image scanner, responsive to fluorescent emission for acquiring a second image of the second section of the printed word processing document, for providing a second signal indicative of the second image;
wherein the printed word processing document is scanned into an electronic archival system, and the key information of the second section is detected, extracted and indexed so that the scanned document can be retrieved based on the key information.

23. The system of claim 22, wherein the printed word processing document is a document printed on paper, wherein the first section comprises words or symbols and the second section comprises words or symbols.

24. The system of claim 22, wherein the first and second sections each comprise a black color ink.

25. The system of claim 22, wherein the second section comprises at least two different fluorescent inks.

26. The system of claim 25, wherein one of the fluorescent inks comprises invisible ink.

27. The system of claim 26, wherein the invisible ink is used to print an invisible bar code or optical character recognition text.

28. The system of claim 25, wherein the fluorescent inks differ in ultraviolet wavelengths at which they fluoresce, wherein the system classifies the key information based on the wavelengths.

29. A system for printing the word processing document of claim 21, the system comprising:
a print head system adapted to print at least two different inks on the document, including the first ink and the second different ink;
a controller for controlling application of the first and second inks by the print head system on the document, wherein the controller is adapted to print the first and second inks such that the first and second inks are visually indiscernible from each other in white light, and the second ink is discernible from the first ink when subjected to fluorescent-excitation radiation.

30. The system of claim 29, wherein the print head system comprises at least two print heads.

31. The system of claim 29, wherein the print head comprises a single print head adapted to pass by an area on the document at least two times, a first one of the times for printing the first ink and a second one of the times for printing the second ink.

32. The system of claim 29, wherein the first and second sections each comprise a black color ink.

33. The system of claim 29, wherein the second section comprises at least two different fluorescent inks.

34. The system of claim 33, wherein one of the fluorescent inks comprises an invisible ink.

35. The system of claim 34, wherein the invisible ink is used to print an invisible bar code or optical character recognition text.

36. A method for embedding and extracting key information in the printed word processing document of claim 21 comprising the steps of:

subjecting the printed word processing document to a first image scanner, responsive to visible light for acquiring a first image of the first section for providing a first signal indicative of the first image; and subjecting the printed word processing document to a second image scanner, responsive to fluorescent emission for acquiring a second image of the second section for providing a second signal indicative of the second image; the first section and the second section each comprising a black ink;

wherein the printed word processing document is scanned into an electronic archival system, and the key information of the second section is detected, extracted and indexed so that the scanned document can be retrieved based on the key information.

\* \* \* \* \*